United States Patent
Zank et al.

(10) Patent No.: US 10,596,995 B2
(45) Date of Patent: Mar. 24, 2020

(54) METHOD TO LOCK, UNLOCK AND START A VEHICLE

(71) Applicant: FORD GLOBAL TECHNOLOGIES, LLC, Dearborn, MI (US)

(72) Inventors: Uwe Zank, Pulheim (DE); Ralf Strokosch, Cologne (DE); Ahmet Cinar, Cologne (DE); Sebastian Oppenlaender, Wesseling (DE); Markus Wolff, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 15/866,032

(22) Filed: Jan. 9, 2018

(65) Prior Publication Data
US 2018/0194321 A1    Jul. 12, 2018

(30) Foreign Application Priority Data

Jan. 11, 2017   (DE) ........................ 10 2017 200 380

(51) Int. Cl.
| | | |
|---|---|---|
| *B60R 25/04* | (2013.01) | |
| *B60R 25/24* | (2013.01) | |
| *B60R 25/20* | (2013.01) | |
| *G07C 9/00* | (2020.01) | |
| *B60R 25/01* | (2013.01) | |
| *E05B 81/78* | (2014.01) | |

(52) U.S. Cl.
CPC .............. *B60R 25/04* (2013.01); *B60R 25/01* (2013.01); *B60R 25/209* (2013.01); *B60R 25/2036* (2013.01); *B60R 25/248* (2013.01); *G07C 9/00182* (2013.01); *G07C 9/00309* (2013.01); *B60R 2025/0405* (2013.01); *E05B 81/78* (2013.01); *G07C 2009/00555* (2013.01)

(58) Field of Classification Search
CPC . B60R 25/2036; B60R 25/209; B60R 25/248; G07C 9/00182
USPC .............................................................. 701/2
See application file for complete search history.

(56) References Cited

U.S. PATENT DOCUMENTS

| | | |
|---|---|---|
| 5,467,080 A | 11/1995 | Stoll et al. |
| 5,937,065 A | 8/1999 | Simon et al. |
| 9,002,540 B2 | 4/2015 | Ledendecker |
| 9,725,069 B2 | 8/2017 | Krishnan |

(Continued)

FOREIGN PATENT DOCUMENTS

| | | |
|---|---|---|
| CN | 102566559 A | 7/2012 |
| CN | 104724057 A | 6/2015 |

(Continued)

OTHER PUBLICATIONS

Aurelien Francillon et al., Relay Attacks on Passive Keyless Entry and Start Systems in Modern Cars, Dept. of Computer Science, ETH Zurich, Switzerland, 15 pgs.

(Continued)

*Primary Examiner* — Maceeh Anwari
(74) *Attorney, Agent, or Firm* — Frank Lollo; Brooks Kushman P.C.

(57) ABSTRACT

The disclosure relates to a method to lock, unlock and start a vehicle without using a radio key or electronic vehicle key. According to the disclosure, the function of starting the vehicle without actively using the key is blocked when the vehicle is locked. When the vehicle is unlocked in a manner secured against relay station attacks, the possibility exists of starting the vehicle without actively using the key.

17 Claims, 1 Drawing Sheet

(56) References Cited

U.S. PATENT DOCUMENTS

2013/0259232 A1   10/2013   Petel
2013/0297194 A1   11/2013   Wisnia et al.

FOREIGN PATENT DOCUMENTS

| DE | 102011013605 A1 | 9/2012 |
| DE | 102013013391 A1 | 2/2015 |
| GB | 2421107 A | 6/2006 |
| JP | H082383 A | 1/1996 |
| JP | 2002295085 A | 10/2002 |
| JP | 2007224663 A | 9/2007 |
| KR | 20110047327 A | 5/2011 |
| KR | 20110072258 A | 6/2011 |

OTHER PUBLICATIONS

Mercedes-Benz TechCenter, Keyless-Go, Nov. 28, 2017, http://techcenter.mercecdes-benz.com/en/keylessgo/detail.html, 2 pgs.

METHOD TO LOCK, UNLOCK AND START A VEHICLE

CROSS-REFERENCE TO RELATED APPLICATIONS

This application claims foreign priority benefits under 35 U.S.C. § 119(a)-(d) to DE Application 10 2017 200 380.4 filed Jan. 11, 2017, which is hereby incorporated by reference in its entirety.

TECHNICAL FIELD

The disclosure relates to a method to lock, unlock and start a vehicle, particularly a motor vehicle, with a radio key, or an electronic vehicle key.

BACKGROUND

A keyless remote start system is a system for unlocking a vehicle without actively using a car key (so called passive vehicle unlock) and starting it by merely actuating a starting knob. For this purpose, a user only needs to carry a radio key or electronic vehicle key. If only a passive vehicle unlocking is possible, this is called keyless entry.

When the user approaches the vehicle or, e.g., touches a door handle of the vehicle, a device installed in the vehicle is woken up and sends a radio signal to the radio key with a first frequency in the range of between 30 and 300 kHz, which contains a coded enquiry signal. The radio key decodes the enquiry signal, provides it with new coding and sends it out again as a response signal at a second frequency located in the UHF range as illustrated in FIG. 1. The device installed in the vehicle knows the coding arrangement of the radio key, and, if a response signal corresponds to a response signal to be expected, the vehicle is unlocked. The range of the radio signal having the first lower frequency is restricted to a few meters so that the device at the vehicle can normally be woken up only by a radio key located close to the vehicle.

A range extension or a relay station attack (hereinafter "RSA") primarily extends the range of the radio signal having the lower frequency using two relay stations, a first one in the vicinity of the vehicle door and a second one in the vicinity of a person who carries the radio key, as will be described in FIG. 2 that follows.

An attacker who carries the first relay station wakes up the device at the vehicle, e.g. by touching the door handle so that the latter sends the radio signal having the lower frequency. This is received by the first relay station and sent by the latter at a quite different frequency to the second relay station, which converts the radio signal again into the original radio signal having the lower frequency and sends it to the radio key. The response signal of the radio key is normally strong enough to bridge a distance back to the vehicle and opens the vehicle (so-called "small variant of the RSA"). If the response signal of the radio key is not strong enough, the relay stations can provide a return channel that extends a range of the radio signal having the higher frequency (so-called "large variant of the RSA").

A passive vehicle start is triggered independently of the passive vehicle unlocking in the prior art if the key is recognized as being located in the vehicle, e.g. by a further near-field communication within the passenger space, and a starting button on the dashboard is pushed. Therefore, this function can also be triggered by an RSA when a thief has entered the vehicle, whether by RSA or by breaking in, and the thief can drive the vehicle away.

SUMMARY

The disclosure is based on the object of providing a secure method to lock, unlock and start a vehicle with a radio key, or an electronic vehicle key.

According to the disclosure, a function of starting the vehicle without actively using the key (so called passive starts) is blocked when the vehicle is locked, and this function is only released again when the vehicle is unlocked in a manner secured against relay station attacks.

Secure unlocking against relay station attacks can take place in various ways that can also be available to a user as alternatives.

In a preferred embodiment, the function of starting the vehicle without actively using the key is only released again when the vehicle is unlocked by a dedicated unlocking command from an access-authorized person who is normally an owner of the vehicle, a dedicated unlocking command here being understood as something that cannot be triggered by mere approaching the vehicle, but only by targeted action of the access-authorized person.

The dedicated unlocking command can preferably be issued by one or more of the following actions of the access-authorized person: actuating an operating element such as, e.g., a switch or a button on the key; operating an opening keypad on the vehicle, i.e. buttons mounted on the vehicle and operable from the outside in the case of a locked vehicle, which can also be hidden to a greater or lesser degree, or inputs at a device for telematics control of the vehicle such as, e.g., a smartphone configured for this purpose.

In addition, it can be provided that the vehicle can also be unlocked conventionally with a mechanical bit on the key that also releases the function of starting the vehicle at least without further active use of the key.

Naturally, the aforementioned unlocking methods mean a certain loss of comfort compared with a keyless remote start system, but a comfort function is maintained of being able to start the vehicle without actively using the key.

A further advantage of the disclosure consists in that the passive vehicle start would automatically also profit from any additional safety measures against relay station attacks on unlocking of the vehicle in the case of approach of the associated key, i.e. it is sufficient to improve the safety of the vehicle unlocking, as a result of which the passive vehicle start is automatically also improved in its manipulation safety by coupling with the unlocking.

In each of the abovementioned actions that need some radio communication, the latter is preferably secured with rolling codes as known, e.g., from GB 2 421 107 A.

The function of starting the vehicle without actively using the key is preferably blocked again after a preset period of time has elapsed after the unlocking command without the user having started the vehicle.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A description of illustrative embodiments follows.

Figure 1:
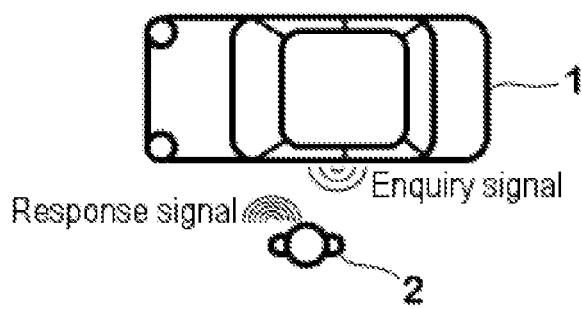
FIG. 1 is a schematic representation of a key communicating commands to a vehicle.
Figure 2:
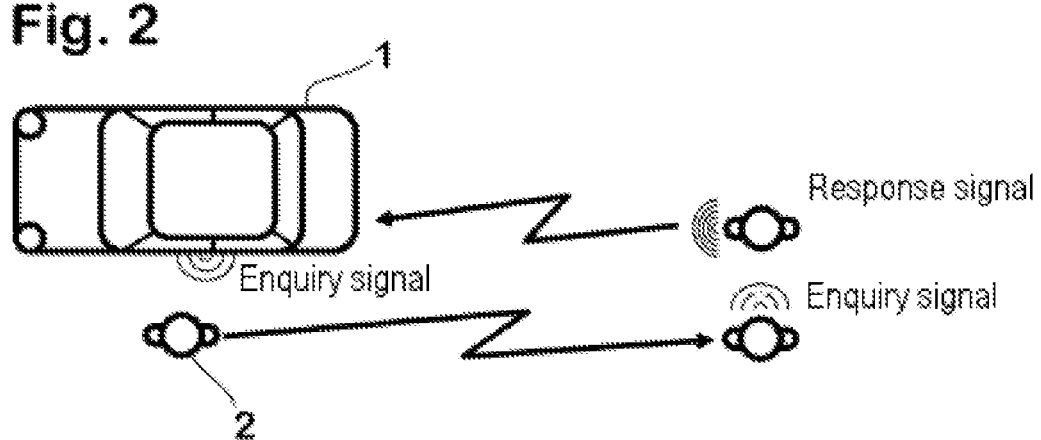
FIG. 2 is a schematic representation of a keyless remote start system according to the disclosure.

In a system as described above with reference to FIGS. 1 and 2 it is also possible, as a rule, to start a vehicle 1 without actively using a key 2 by pressing a starting knob on the dashboard if the key 2 is recognized as being located in the vehicle 1. For this purpose, it is tested via near-field communication of very short range and coded to be rolling whether the key 2 is obviously located in the vehicle 1 and, if this is so, the starting knob is released.

In the illustrative embodiments described in the text which follows, the starting knob is released also under the further condition that before that, unlocking of the vehicle 1 has taken place in a manner secure against relay station attacks.

For this purpose, the vehicle 1 does not by itself send an enquiry signal when somebody is approaching the vehicle 1 or touches a door handle but the vehicle 1 can only be unlocked by a dedicated unlocking command given from outside, which is encrypted with a rolling code.

In an illustrative embodiment, the vehicle user can issue a dedicated unlocking command by actuating an operating element such as, e.g., a switch or a button on the key 2 as is provided in the so-called RKE (Remote Keyless Entry).

In another illustrative embodiment, the user can issue the unlocking command also by inputting a code on an opening keypad on the vehicle 2. Such a keypad is a group of buttons mounted on the vehicle 1 and actuable from the outside in the case of a locked vehicle 1, which can also be hidden to a greater or lesser extent and the actuation of which is detected from mechanical pressure, from electrical field changes on approach of a finger or by optical detection of the finger.

In another illustrative embodiment, the user can also issue the unlocking command at a device for telematics control of the vehicle 1. This can be, e.g., a suitable app on a smartphone or the unlocking can be issued under remote control by a service center of the vehicle manufacturer after the user has identified himself as access-authorized.

So that the function of starting the vehicle 1 without actively using the key 2 is not released permanently by an accidentally issued unlocking command, it is blocked again after a preset period of time has elapsed without the user having started the vehicle 1.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method to lock, unlock and start a vehicle, comprising:
    blocking, when the vehicle is locked, a vehicle start, the vehicle start being without actively using an electronic vehicle key;
    unlocking the vehicle such that the vehicle is secured against relay station attacks; and
    in response to a passive start command within a preset period of time after the unlocking, passively starting the vehicle without actively using the electronic vehicle key; and
    in response to the passive start command after the preset period of time has elapsed after the unlocking, blocking any subsequent passive starts of the vehicle without actively using the key.

2. The method as claimed in claim 1, wherein unlocking the vehicle includes issuing a dedicated unlocking command from an access-authorized person.

3. The method as claimed in claim 2, wherein issuing the dedicated unlocking command includes actuating an operating element on the key.

4. The method as claimed in claim 2, wherein issuing the dedicated unlocking command includes operating an opening keypad on the vehicle.

5. The method as claimed in claim 2, wherein issuing the dedicated unlocking command includes using inputs at a device for telematics control.

6. The method as claimed in claim 1, wherein the electronic key uses rolling codes.

7. A vehicle, comprising:
    an electronic key associated with the vehicle; and
    a device configured to:
    in response to a passive start command, generated without actively using the electronic key and the vehicle being locked, block a start of the vehicle;
    in response to an unlock command secured against relay station attacks followed by a passive start command generated without actively using the electronic key within a preset period of time after the unlock command, passively starting the vehicle; and
    in response to the passive start command after a preset period of time has elapsed after the unlock command, blocking subsequent passive starts.

8. The vehicle as claimed in claim 7, wherein the unlock command is a dedicated unlock command from an access-authorized person.

9. The vehicle as claimed in claim 8, wherein the dedicated unlock command includes actuation of an operating element on the key.

10. The vehicle as claimed in claim 8, wherein the dedicated unlock command includes operation of an opening keypad on the vehicle.

11. The vehicle as claimed in claim 8, wherein the dedicated unlock command includes using, inputs at a device for telematics control.

12. A vehicle system comprising:
    a device configured to, in response to a passive start command and the vehicle being locked, block a start of the vehicle,
    in response to an unlock command secured against relay station attacks followed by the passive start command, start the vehicle, and
    in response to a preset period of time elapsing after the unlock command, block subsequent passive starts of the vehicle.

13. The vehicle system as claimed in claim 12, wherein the unlock command is a dedicated unlock command from an access-authorized person.

14. The vehicle system as claimed in claim 13, wherein the dedicated unlock command includes actuation of an operating element on the key.

15. The vehicle system as claimed in claim 13, wherein the dedicated unlock command includes operation of an opening keypad on the vehicle.

16. The vehicle system as claimed in claim 13, wherein the dedicated unlock command includes using inputs at a device for telematics control.

17. The vehicle system as claimed in claim 12, wherein an electronic key associated with the passive start commands uses rolling codes.

\* \* \* \* \*